United States Patent
Price et al.

(10) Patent No.: US 10,401,956 B2
(45) Date of Patent: Sep. 3, 2019

(54) INFRARED EYE-TRACKING IN HIGH AMBIENT LIGHT CONDITIONS

(71) Applicant: Microsoft Technology Licensing, LLC, Redmond, WA (US)

(72) Inventors: Raymond Kirk Price, Redmond, WA (US); Michael Bleyer, Seattle, WA (US); Denis Demandolx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 62 days.

(21) Appl. No.: 15/593,180

(22) Filed: May 11, 2017

(65) Prior Publication Data

US 2018/0329489 A1    Nov. 15, 2018

(51) Int. Cl.

| | |
|---|---|
| *G06F 3/01* | (2006.01) |
| *G02B 27/01* | (2006.01) |
| *G02B 27/00* | (2006.01) |
| *G06K 9/00* | (2006.01) |

(Continued)

(52) U.S. Cl.
CPC .............. *G06F 3/013* (2013.01); *G01J 1/044* (2013.01); *G02B 27/0093* (2013.01); *G02B 27/0172* (2013.01); *G06K 9/0061* (2013.01); *G06K 9/00604* (2013.01); *G06K 9/2018* (2013.01); *G06K 9/2027* (2013.01)

(58) Field of Classification Search
CPC .. G01J 1/044; G01J 2001/446; G02B 27/0093
See application file for complete search history.

(56) References Cited

U.S. PATENT DOCUMENTS

2010/0059660 A1*  3/2010  Satoh ................... G01J 1/1626
                                                                                   250/205
2013/0250243 A1    9/2013  Cech
(Continued)

FOREIGN PATENT DOCUMENTS

| EP | 2731049 A1 | 5/2014 |
| WO | 2016148920 A1 | 9/2016 |

OTHER PUBLICATIONS

Topal, et al., "A Head-Mounted Sensor-Based Eye Tracking Device: Eye Touch System", In Proceedings of the Eye Tracking Research & Application Symposium, Mar. 26, 2008, pp. 1-4.
(Continued)

*Primary Examiner* — Chun-Nan Lin
(74) *Attorney, Agent, or Firm* — Alleman Hall Creasman & Tuttle LLP

(57) ABSTRACT

An eye-tracking system comprises one or more optical sources configured to emit infrared light with a narrow spectral linewidth toward an eye of a user and one or more shuttered optical sensors configured to receive infrared light reflected off the eye of the user. A controller is configured to pulse the one or more optical sources on and off, such that a pulse-on duration is less than a duration needed to fully thermalize each optical source. The controller is also configured to open the shuttered optical sensor for a detection duration based on the pulse-on duration. A conformation of the user's eye may be indicated based on infrared light received at the shuttered optical sensor during the detection duration.

10 Claims, 7 Drawing Sheets

(51) Int. Cl.
*G01J 1/04* (2006.01)
*G06K 9/20* (2006.01)

(56) References Cited

U.S. PATENT DOCUMENTS

| | | |
|---|---|---|
| 2014/0254617 A1* | 9/2014 | Oh .................... H01S 3/1062 |
| | | 372/20 |
| 2014/0268055 A1 | 9/2014 | Skogo et al. |
| 2015/0062322 A1 | 3/2015 | Gustafsson et al. |
| 2015/0070273 A1* | 3/2015 | He ...................... G06F 3/013 |
| | | 345/156 |
| 2016/0070342 A1 | 3/2016 | Taylor et al. |
| 2016/0092731 A1* | 3/2016 | Dainty ............... G06K 9/00604 |
| | | 348/78 |
| 2016/0109575 A1 | 4/2016 | Oggier et al. |
| 2016/0116979 A1 | 4/2016 | Border |
| 2018/0229051 A1* | 8/2018 | Chen .................... A61N 5/0613 |
| 2018/0292896 A1* | 10/2018 | Hicks ..................... G06F 3/013 |

OTHER PUBLICATIONS

Quan, et al., "An Effective Method and Device for Eye Detection with Physical Properties", In Proceedings of the 2nd International Conference on Computer Science and Electronics Engineering, Jan. 2013, pp. 0749-0752.

* cited by examiner

INFRARED EYE-TRACKING IN HIGH AMBIENT LIGHT CONDITIONS

BACKGROUND

Eye-tracking or gaze-tracking systems and techniques may be utilized to determine a direction and/or location of a person's gaze. In some examples, a light source may illuminate the eye of a user and a corresponding photodetector may capture light reflected off the eye. The captured light may be utilized to determine a direction and/or location of a user's gaze in a surrounding environment.

DETAILED DESCRIPTION

Eye-tracking and gaze tracking can provide a natural user-interface (NUI) based on the direction of a user's gaze. In such an interface, an image of the user's eye is acquired by an imager. Ocular features such as the pupil or iris are located within the acquired image, and a gaze direction may be determined based on the locations of such features. Gaze direction computed in this manner may be used to navigate a graphical user-interface, to launch a program, make a selection of an on-screen object, move a character in a game, optimize graphical rendering for a limited angular resolution and so on.

Eye-tracking is typically performed by directing infrared (IR) light from an optical source towards the eye and capturing IR light that reflects off the eye. Typically, wavelengths of IR light used for eye detection fall in the range of ~800-850 nm. Using IR light, as opposed to visible light in the 400-700 nm range, avoids the generation of a visible glow from the optical sources that may annoy or distract the user, and prevents the contamination of visible light reflections in the eye imaging path. In the 800-850 nm range, standard silicon photodetectors (e.g., complimentary metal-oxide-semiconductors or CMOS sensors) have a relatively high quantum efficiency (QE). IR light emitting diodes (LEDS) and corresponding CMOS sensors are also relatively inexpensive. This combination of features has led to such combinations being an industry standard both for eye-tracking and time-of-flight (ToF) depth camera applications.

However, the QE of CMOS sensors is limited by the optical penetration depth and corresponding absorption in the active region of the photodetectors. Further, most eye-tracking applications are configured for use indoors and/or within an enclosed headset. For these applications, ambient light is not a significant source of interference in the 800-850 nm range. For mixed reality applications, e.g., utilizing a see-through display, the 800-850 nm range may be sufficient for indoor use, but is insufficient if the device is used outdoors where ambient sunlight generates substantial IR interference. Increasing output illumination power may not significantly improve the signal to noise ratio, and would result in significant power consumption, which may be impractical for a battery-operated device.

Figure 1:
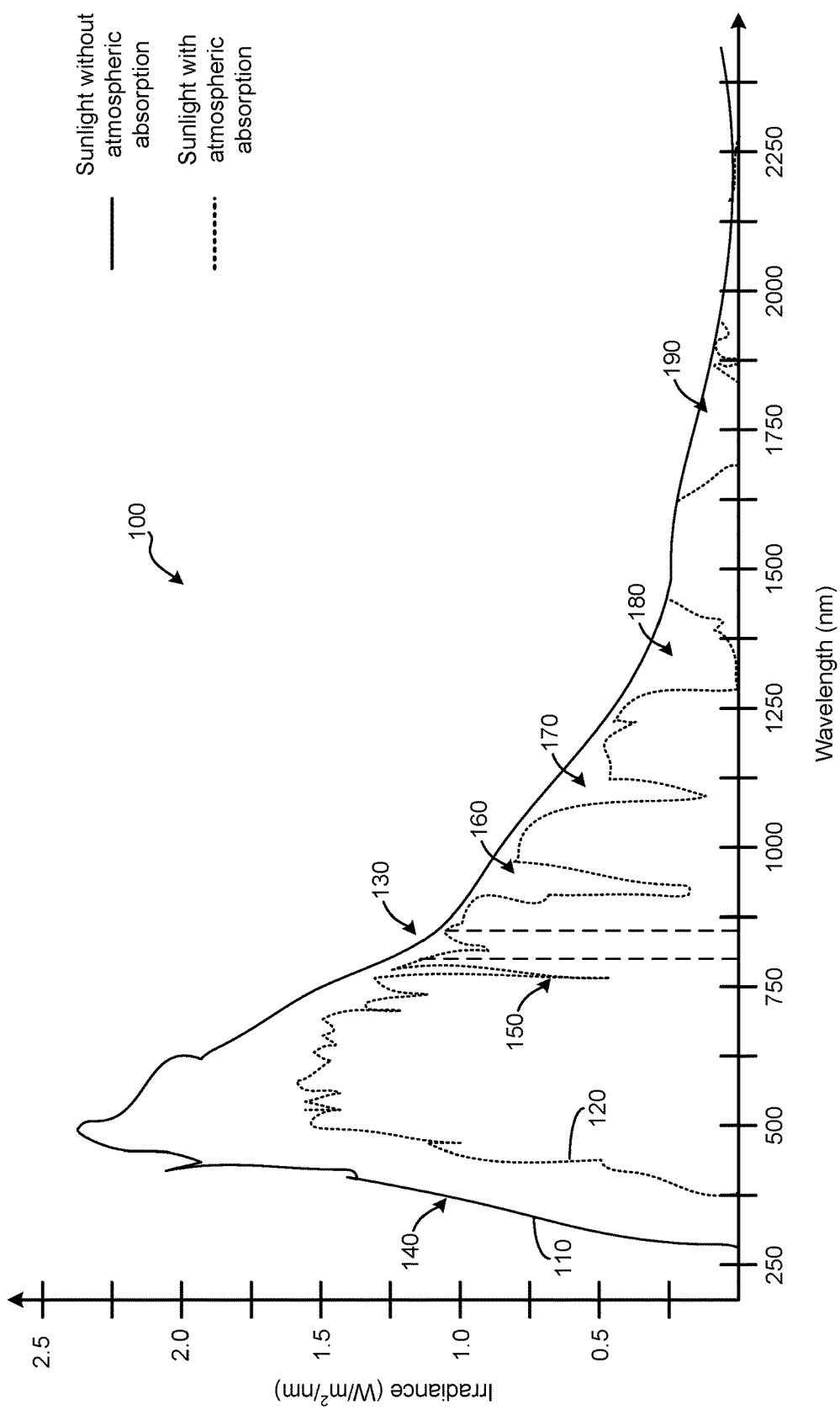
FIG. 1 shows a chart depicting the spectral irradiance of the sun.

While indoor lighting may generate interfering light on the order of 50-400 lux, sunlight may generate interfering light on the order of 1000-100,000 lux or higher. FIG. 1 shows an example chart 100 depicting solar irradiance across emission wavelengths for sunlight without atmospheric absorption (e.g., outside of Earth's atmosphere) (plot 110) and for sunlight with atmospheric absorption (e.g., within Earth's atmosphere) (plot 120). As depicted at 130, sunlight between 800 and 850 nm passes through the Earth's atmosphere with an irradiance on the order of 1 Watt-per-meter-sq.-per-nm. However, the components of Earth's atmosphere strongly absorb some wavelengths of sunlight. For example, ozone ($O_3$) absorbs significant amounts of UV light below 300 nm, as shown at 140. Oxygen ($O_2$) absorbs significant amounts of near-IR light at ~750 nm, as shown at 150. Water absorbs IR light at numerous wavelengths, including ~940 nm (160), 1100 nm (170), 1300 nm (180), 1800 nm (190), and higher wavelengths.

Using a wavelength that experiences a high degree of atmospheric absorption, and hence a natural drop in solar irradiance, may reduce ambient light interference and thus increase signal-to-noise ratios for an eye-tracking device operating outdoors. For example, operating at 940 nm would reduce the amount of interfering ambient solar irradiation by nearly six-fold. By reducing the interference from ambient light, it may be possible to reduce the total illumination power required to generate ocular images. However, traditional silicon photosensors are less sensitive to longer wavelengths. Optical source operation may thus require increased power consumption to generate enough photons to induce an electrical signal at the sensor.

Figure 2A:
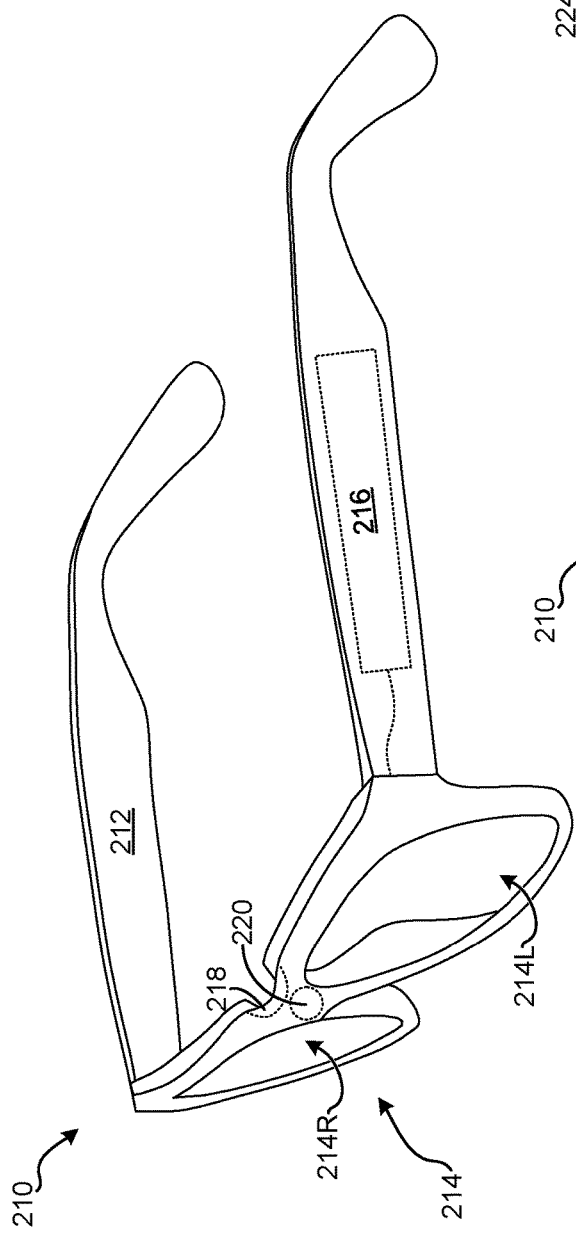
FIG. 2A shows a schematic view of a head-mounted display device with eye tracking capabilities according to an example of the present disclosure.
Figure 2B:
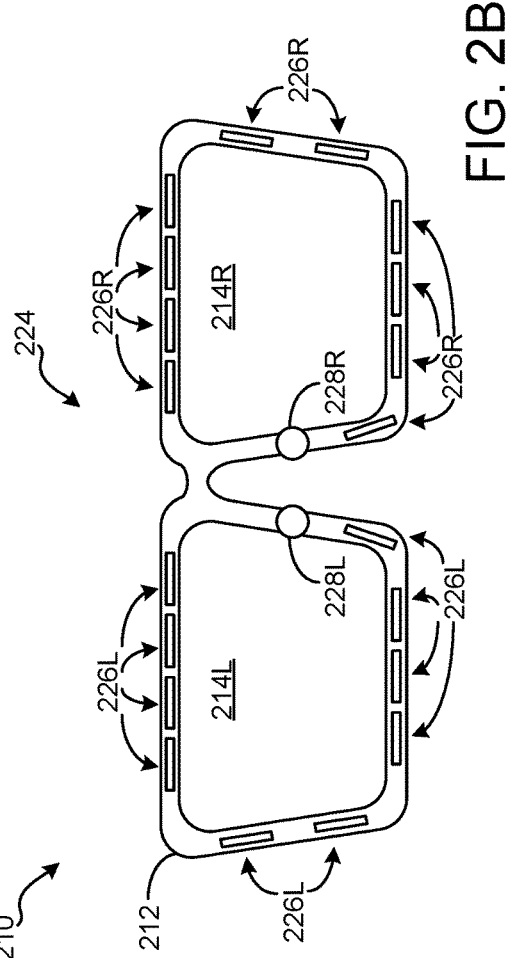
FIG. 2B shows an additional view of the head-mounted display device with eye tracking capabilities of FIG. 2A.

FIGS. 2A and 2B schematically illustrate an example head-mounted display device 210. The head-mounted display device 210 includes a frame 212 in the form of spectacles wearable on the head of a user that supports see-through display componentry positioned nearby the user's eyes. Head-mounted display device 210 may use augmented reality technologies to enable simultaneous viewing of virtual display imagery and a real-world background. As such, head-mounted display device 210 may generate virtual images via see-through display 214, which includes separate right and left eye displays 214R and 214L, and which may be wholly or partially transparent.

See-through display 214 may take any suitable form, such as a waveguide or prism configured to receive a generated image and direct the image towards a wearer's eye. See-through display 214 may include a backlight and a microdisplay, such as liquid-crystal display (LCD) or liquid crystal on silicon (LCOS) display, in combination with one or more light-emitting diodes (LEDs), laser diodes, and/or other light sources. In other examples, see-through display 214 may utilize quantum-dot display technologies, active-matrix organic LED (OLED) technology, and/or any other suitable display technologies. It will be understood that while shown in FIGS. 2A and 2B as a flat display surface with left and right eye displays, see-through display 214 may be a single display, may be curved, or may take any other suitable form. Head-mounted display device 210 may further include an additional see-through optical component, such as a see-through veil positioned between see-through display 214 and the real-world environment as viewed by a wearer.

A controller 216 is operatively coupled to see-through display 214 and to other display componentry. Controller 216 includes one or more logic devices and one or more computer memory devices storing instructions executable by the logic device(s) to enact functionalities of head-mounted display device 210. Head-mounted display device 210 may further include various other components, for example a two-dimensional image camera 218 (e.g. a visible light camera and/or infrared camera) and a depth imaging device 220, as well as other components that are not shown, including but not limited to speakers, microphones, accelerometers, gyroscopes, magnetometers, temperature sensors, touch sensors, biometric sensors, other image sensors, energy-storage components (e.g. battery), a communication facility, a GPS receiver, etc.

Depth imaging device 220 may include an infrared light-based depth camera (also referred to as an infrared light camera) configured to acquire video of a scene including one or more human subjects. The acquired video may include a time-resolved sequence of images of spatial resolution and frame rate suitable for the purposes set forth herein. Depth imaging device 220 and/or a cooperating computing system (e.g., controller 216) may be configured to process the acquired video to identify one or more objects within the operating environment, one or more postures and/or gestures of the user wearing head-mounted display device 210, one or more postures and/or gestures of other users within the operating environment, etc.

Continuing in FIG. 2B, head-mounted display system 210 also includes an eye-tracking system 224 configured to sense a position of the right and/or left eye of the user of head-mounted display system 210. Although depicted as part of head-mounted display system 210, eye-tracking system 224 or similar eye-tracking systems may be incorporated within desktop computers, PCs, hand-held smart phones, e-readers, laptop, notebook and tablet computers, standalone displays, automotive computers, etc. While described mainly in the context of eye-tracking or gaze-tracking, eye-tracking system 224 or similar eye-tracking systems may additionally or alternatively be utilized in iris recognition and other security applications, and/or in safety applications such as driver alertness detection.

In the example depicted in FIG. 2B, eye-tracking system 224 includes a plurality of optical sources (226L and 226R) that are mounted to frame 212 and configured to emit infrared light rays toward the eye of the user. For example, optical sources 226L may be configured to emit light rays towards the left lens of the left eye of the user to produce a plurality of left lens glints, and optical sources 226R may be configured to emit light rays towards the right lens of the right eye of the user to produce a plurality of right lens glints. Optical sources 226L and 226R may direct light to the left and right eye, respectively, via one or more narrow linewidth bandpass filters. Although depicted as being specific to the left and right eye, respectively, in some examples, eye-tracking system 224 may include one or more optical sources configured to emit infrared light rays towards both eyes of the user, be it simultaneously or alternately.

Eye-tracking system 224 further includes shuttered optical sensors 228L and 228R which may be arranged and otherwise configured to receive infrared light reflected off the eye of the user. For example, shuttered optical sensors 228L and 228R may be configured to receive light in the emission-wavelength range of optical sources 226L and 226R. Shuttered optical sensors 228L and 228R may each include a plurality of light-receiving photo-sensors. Image data generated by shuttered optical sensors 228L and 228R may be conveyed to computing device 216 and/or one or more additional processors for processing and/or analysis.

Although depicted at the interior of frame 212, shuttered optical sensors 228L and 228R may be coupled to frame 212 at any position suitable to receive light reflected from the eyes of the user. Shuttered optical sensors 228L and 228R may include one or more shuttering devices configured to selectively expose the sensor to light. In some examples, closing of the shutter may block a substantial amount of light from entering its respective sensor, thus generating a high contrast ratio between the open and closed states.

Image data generated by shuttered optical sensors 228L and 228R may be processed to resolve such features as pupil center, pupil outline, and/or one or more specular glints from the cornea. Using this information, eye-tracking system 224 may determine a direction and/or at what physical object or virtual object the user is gazing. Eye-tracking system 224 may further determine at what point on a physical or virtual object the user is gazing. Such gaze tracking data may then be provided to the computing device 216, and may be utilized by one or more applications or other programs as needed. As an example, a bright pupil technique may be utilized in which the light emitted from optical sources 226L and 226R is coaxial with the optical path of the eye, causing the light to reflect off the retina. In other examples, a dark pupil technique may be utilized in which the emitted light is offset from the optical path.

Figure 3:
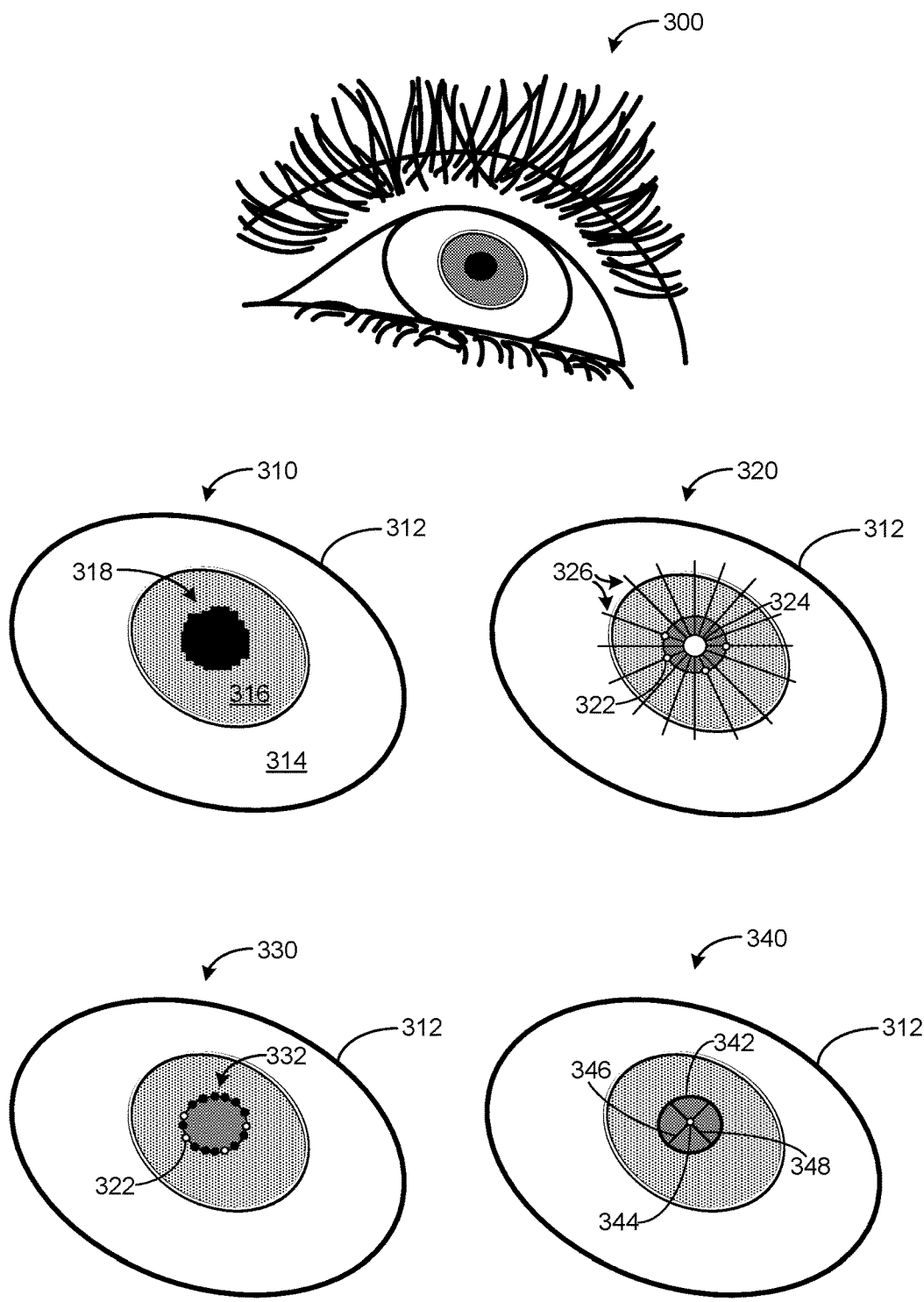
FIG. 3 schematically depicts a method for identifying a pupil based on infrared imaging of a user's eye.

Eye-tracking system 224 may generate images of the user's eyes based on infrared light received at the shuttered optical sensors 228L and 228R. Such images may include reflections from the cornea of the eye, or "glints." Positions and properties of the pupil and glints from captured images may be utilized to determine a conformation of a user's eye, including a direction and/or location of a user's gaze in a surrounding environment. As an example, FIG. 3 shows an illustration of a right eye of a user at 300. At 310, an example eye image 312 is depicted. Eye image 312 may be generated based on infrared light captured by shuttered optical sensor 228R, for example.

Eye image 312 may be used to identify rough regions of the eye, such as sclera 314, iris 316, and pupil 318. For example, at least a subset of the pixels of eye image 312 may be used to generate rough pupil region 318 to provide an initial approximation of the actual location and shape of the pupil of the eye. In some examples, potential rough pupil regions may be generated by extracting one or more stable regions from the eye image 312. An input image may be convoluted with a pupil-like template image. Pixels with a high convolution response may be isolated as potential pupil centers. In some examples, potential rough pupil regions may be generated by using one or more classifiers to classify each of the pixels into one of a plurality of classification regions. The classes or regions may include, but are not limited to, pupil, iris, sclera, eyelash, background, and glint.

At 320, eye image 312 is shown processed based on the generated rough pupil region 318. Eye-tracking system 224 may extract from rough pupil region 318 a plurality of pupil boundary point candidates 322. An estimated center 324 of the rough pupil region 318 may be determined, and a plurality of rays 326 may be cast radially from center 324. Along each ray 326, an area of sudden color intensity change will exist at the boundary between rough pupil region 318 and rough iris region 316 in image 312. Accordingly, eye-tracking system 224 may evaluate each ray 326 and the rough pupil region 318 to identify areas of sudden color intensity change. Eye-tracking system 224 may then extract a pupil boundary point candidate 322 corresponding to each such area.

At 330, eye image 312 is shown following further processing based on the pupil boundary point candidates 322. Eye-tracking system 224 may fit a parametric curve to pupil boundary point candidates 322 to extract additional pupil boundary point candidates 332. As shown at 340, boundary point candidates 322 and 332 may then be used to generate an estimated pupil region 342 of the eye of a user that follows or closely approximates a pupil-iris boundary line. Estimated pupil region 342 may be fit to an ellipse. A pupil center 344 may then be determined based on ellipse axes 346 and 348. The location of pupil center 344 may then be utilized to conformation of a user's eye, including a direction and/or location of a user's gaze.

As shown in FIG. 2, eye-tracking system 224 may include an array of optical sources (226L & 226R) that surrounds each eye. Each optical source may be configured to emit infrared light with a narrow spectral linewidth toward an eye of a user. For example, each optical source may be configured to emit infrared light that includes 940 nm light. Each optical source may be configured to emit infrared light that is substantially centered at 940 nm. In some examples, each optical source may be a 940 nm single frequency laser. Other frequencies of light may be emitted by each optical source, including IR light with frequencies greater than or less than 940 nm. For example, each optical source may be centered at a frequency between 900 and 970 nm, or between 1080 and 1140 nm.

Each optical source may be a laser with a narrow beam divergence, such as a laser diode. For example, each optical source may be a vertical-cavity surface-emitting laser (VCSEL). In some examples, each optical source may be an edge emitting laser, collimated diode laser, or other suitable laser. By reducing the emission linewidth of the optical source, the absorption range of the corresponding sensor may also be reduced, thus decreasing the amount of ambient light that can potentially be absorbed. For example, edge emitting lasers may have a full-width half-maximum (FWHM) on the order of 2-5 nm, while VCSELs may have a FWHM on the order of 1 nm.

To further reduce ambient light contamination, each optical source may be paired with narrow linewidth IR bandpass filter. For example, an IR bandpass filter with a transmission range on the order of 20 nm or less may cut down the amount of ambient light received at the sensor by a factor of between 3 and 5-fold. Such a filter may allow for the filtering of external wavelengths without discarding photons emitted by the optical source. Narrow linewidth IR bandpass filters may enable the use of LEDs as an optical source. While LEDs broadband emission on the order of 30-50 nm, the IR bandpass filter may reduce the linewidth of light to which the corresponding receptor needs to be sensitive, thus reducing the amount of ambient light that is likely to be absorbed.

Figure 4:
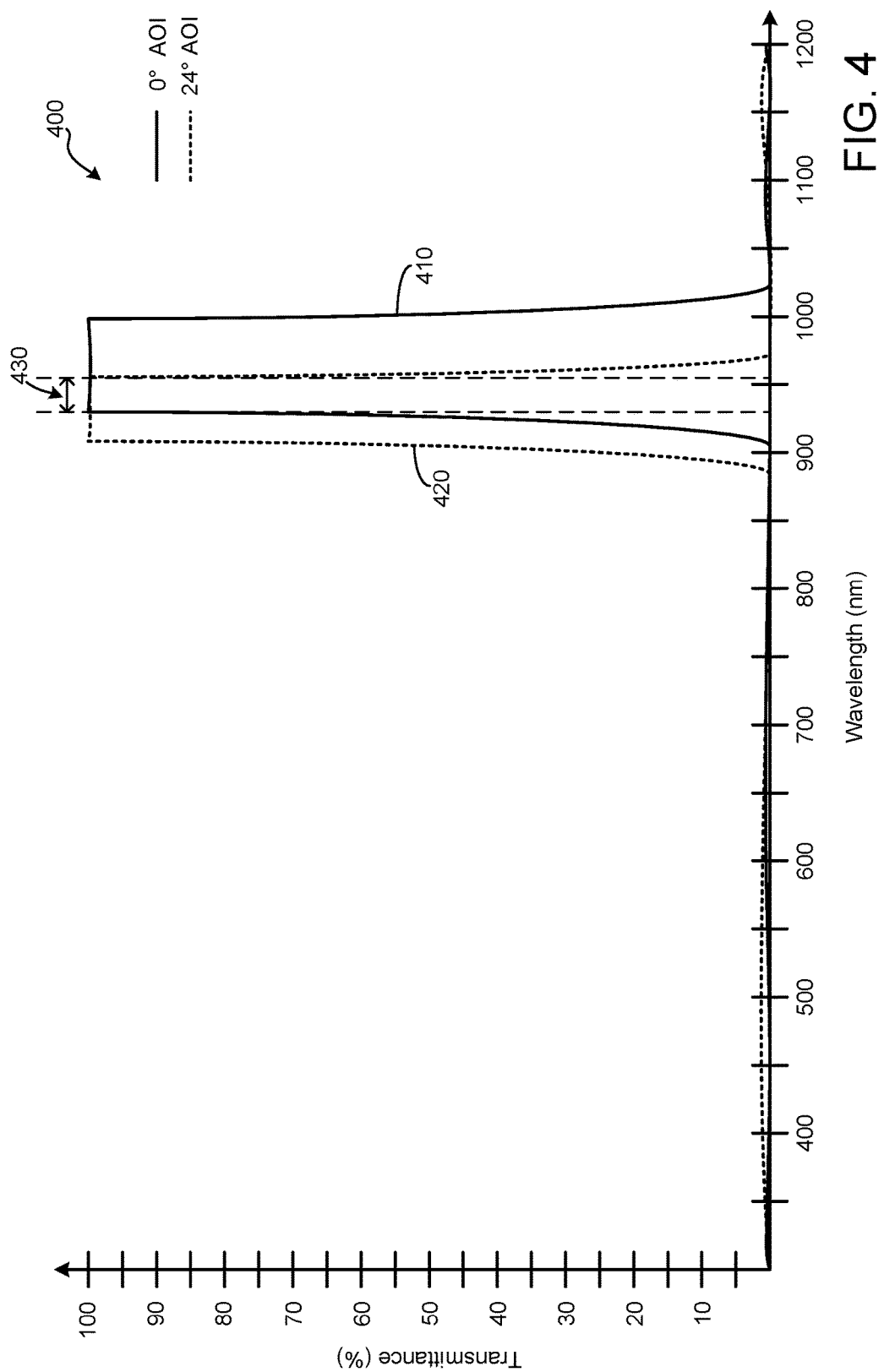
FIG. 4 depicts a chart indicating transmittance of an exemplary IR bandpass filter.

As an example, FIG. 4 depicts a chart 400 indicating transmittance of an exemplary narrow linewidth IR bandpass filter that may be optically coupled between optical sources 226L and 226R and shuttered optical sensors 228L and 228R. Chart 400 includes plot 410, indicating the transmittance of the IR bandpass filter at a 0° angle of incidence (AOI), and plot 420, indicating the transmittance of the IR bandpass filter at a 24° AOI. A targeted bandpass range is indicated at 430. In this example, the targeted bandpass range extends from approximately 920 nm to 960 nm, flanking the 940 nm emission center of the optical sources. At a 0° AOI, the IR bandpass filter transmits nearly 100% of light between 930 nm and 950 nm, blocking nearly 100% of light below 930 nm and above 950 nm.

Eye-tracking system 224 includes one or more shuttered optical sensors (228L, 228R) configured to receive infrared light reflected off the eye of the user. Shuttered optical sensors 228L and 228R may be configured to receive infrared light of wavelengths emitted by optical sources 226L and 226R. As such, if optical sources 226L and 226R emit infrared light centered at 940 nm, optical sensors 228L and 228R may be configured to receive 940 nm IR light via their respective bandpass filters. Each shuttered optical sensor may include a plurality of IR light detectors. For example, a shuttered optical sensor may include a grid of detectors, each detector corresponding to a pixel if the sensed IR light is converted into a visible image.

Traditional eye-tracking sensors (optical source emission between 800 and 850 nm) utilize silicon based sensors, such as PIN photodiodes (P-type intrinsic N-type diode) PIN photodiodes include a thick intrinsic (I) region where there is depletion, (an absence of carriers) where photons are absorbed. The intrinsic region allows the conversion of photons to electrons or electron/hole pairs which are then swept via the built in electric field of the diode.

Figure 5:
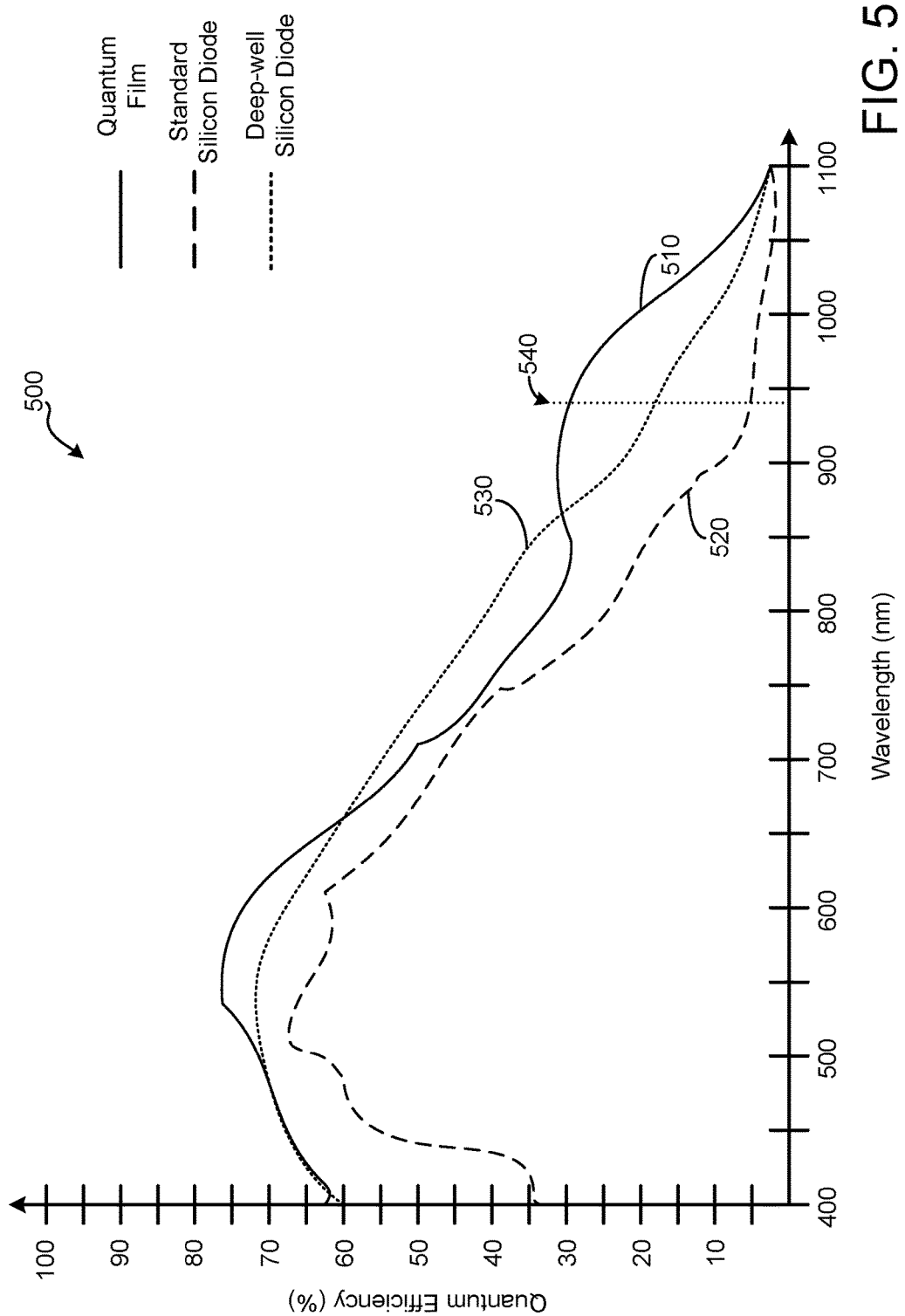
FIG. 5 depicts a chart indicating quantum efficiency of exemplary optical sensor materials.

However, PIN diodes show reduced sensitivity at longer wavelengths. Absorbed photons penetrate deeper into the silicon, but penetrate past the intrinsic region as the incident photons have lower energy. As such their quantum efficiency (QE) drops with increasing wavelength. This phenomenon is illustrated in FIG. 5. FIG. 5 shows a chart 500 indicating quantum efficiency as a function of wavelength for different optical sensors. While silicon sensors have a QE between 20 and 25% in the 800-850 range, their QE at 940 nm is on the order of 5%. This low QE could be offset in part by increasing the illumination power of the corresponding optical sources, but this would increase power consumption and heat generation, neither of which are compatible with an efficient head-mounted display.

For improved quantum efficiency at 940 nm, the shuttered optical sensors may include a deep well PIN sensor, wherein the intrinsic region has an increased thickness in the range of 2-10 µm for a pixel area of 2.5 µm×2.5 µm or greater. By having a thicker or deeper intrinsic region, the probability may be increased (by a factor of ~1.5 fold) that each photon is absorbed in that region and is then converted to an electron or electron hole pair. In some examples, silicon based CMOS or charge coupled device (CCD) sensors with absorption regions of increased depth may also be used. As shown by plot 520 in FIG. 5, deep well silicon diodes may have QE in the order of 15-20% in the 940-950 nm range.

As another example, the shuttered optical sensors may include quantum films sensitive to 940 nm. Quantum films may include a plurality of quantum dots engineered with a size calibrated to absorb light at a predetermined wavelength. For example, and as shown by plot 530 in FIG. 5, ZnS quantum films may have QE on the order of 30% in the 940-950 nm range. As shown at 540, ZnS quantum films thus have a significantly higher (5-6 fold) QE at 940 nm than do standard silicon diodes, while deep well silicon diodes have a 2-3 fold greater QE when compared to standard silicon diodes.

In some examples, quantum films of other compositions may be included in shuttered optical sensors. Such compositions may include SiGe, InGaAs, InGaN, GaAsPh, and/or other III-V compounds. In some examples, the shuttered optical sensors may include PIN diodes made from alloy semiconductors such as InGaAs.

In traditional eye-tracking systems, optical source is operated in a continuous-wave (CW) mode and the illumination time (e.g., the time when the optical source is on) is relatively long (e.g., >2 ms). The shutter at the optical sensor is thus also open for a relatively long duration, which may allow for ambient light interference. The illumination time may be shortened if the optical source power is increased, but optical sources are typically limited in how much power they can supply. Further, this may increase the thermal output of the optical source. The increased power consumption and heat generation may be incompatible with applications such as head-mounted display devices.

To increase the efficiency of the eye-tracking system, the one or more optical sources may be pulsed on and off, such that a pulse-on duration is less than a duration needed to fully thermalize each optical source. In this context, "fully thermalized" refers to the optical source reaching a maximum thermal equilibrium. Turning the optical source off prior to full thermalization may thus refer to turning the optical source off while the optical source is still warming up and prior to reaching a peak thermal output. As an example, the pulse-on durations may be in the range of 10 μs to 100 μs. In some examples, the optical sources may be pulsed on at a reduced duty cycle, e.g. 25-50% duty cycle.

By pulsing the optical sources on for a reduced duration, the peak output power of the optical sources is limited. However, more total output power may be extracted from the optical sources. For example, peak powers may be increased by a factor between 1.5× and 5× the CW rated power, based on the duty cycle. As such, the optical source can be operated at a higher power and higher intensity than if operating in continuous-wave mode. By increasing peak power, more photons are generated which may allow for a reduction in overall sensor exposure time thereby reducing ambient light interference.

The shuttering of the shuttered optical sensors may thus be coordinated with the pulsing of the optical sources. For example, a controller may open the shuttered optical sensors for a detection duration based on the pulse-on duration. For example, the detection duration may substantially overlap with the pulse-on duration. In some examples, the detection duration may be coincident with the pulse-on duration. The shuttered optical sensors may then be closed following the detection duration.

The eye-tracking system may then indicate a conformation of the user's eye based on infrared light received at the shuttered optical sensor during the detection duration. The conformation of the user's eye may include an indication as to whether the eye is open or closed, a location of the user's pupil relative to the other eye features (sclera, eyelids, tear ducts, etc.), a direction of the user's gaze, a size of the user's pupil relative to the user's iris (dilation), etc. In some examples, data gathered from both eyes may be used to determine the conformation of one or both eyes of the user. For example, data from both eyes may be used to determine a direction of a user's gaze, and/or to infer data regarding a first eye, such as if data regarding the second eye is of higher quality.

Figure 6:
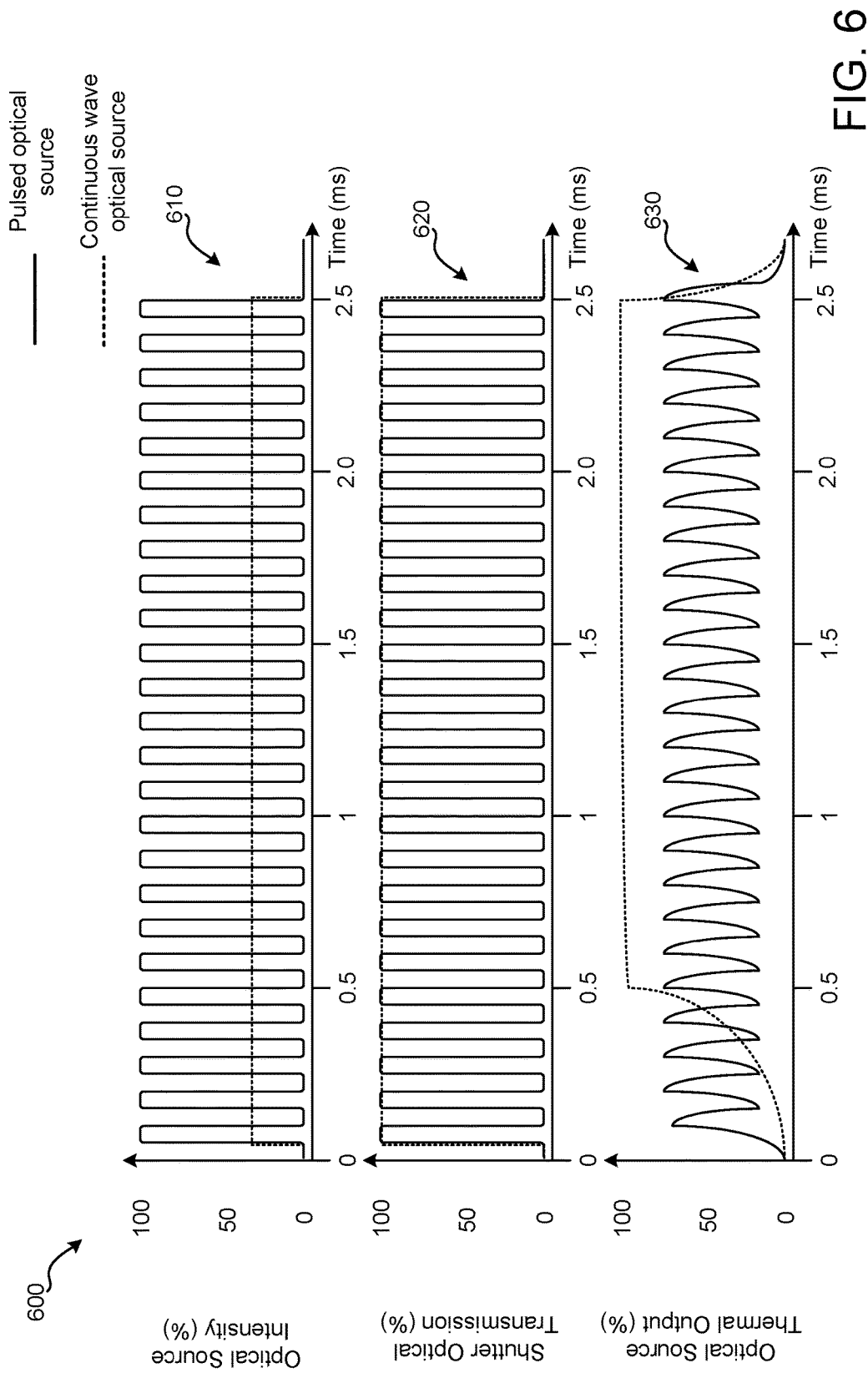
FIG. 6 shows an example timeline depicting coordinated operation of an optical source and an optical sensor.

FIG. 6 shows an example timeline 600 depicting coordinated operation of optical sources and optical sensors. Timeline 600 includes plot 610, indicating an intensity of an optical source over time. Timeline 600 further includes plot 620, indicating an optical transmission of an optical sensor shutter over time, and plot 630, indicating thermal output of an optical source over time. Timeline 600 includes example plots for a pulsed optical source (solid lines) and for a continuous wave optical source (dotted lines). Timeline 600 represents optical source and optical shutter activity for a single example image exposure.

As shown in plot 610, the pulsed optical source is pulsed on and off at 50 μs intervals, while the continuous wave optical source remains on for a 2.5 ms duration. As the pulse-on duration is short, the pulsed optical source does not reach 100% thermal output, as shown in plot 630. As such, the pulsed optical source is operable at approximately 100% intensity. In contrast, although the continuous-wave optical source is merely operated at ~40% intensity, the thermal output of the CW optical source still approaches 100%. As such, the CW optical source must remain on for a longer total duration in order to emit enough photons to generate a high-fidelity signal at the optical sensor.

For each eye-tracking system, the optical shutter is opened to 100% transmission when the respective optical source is turned on, and thus a detection duration is substantially the same as the source-on duration. In this example, the optical shutter for the pulsed optical source is pulsed open and closed at 50 μs intervals, and is thus open for a total sensor exposure time (e.g., from first photon to last photon) of 1.25 ms for a single image exposure. In other examples, this total exposure time may be reduced or may be increased (up to durations on the order of 4-5 ms) in order to prevent motion blur.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
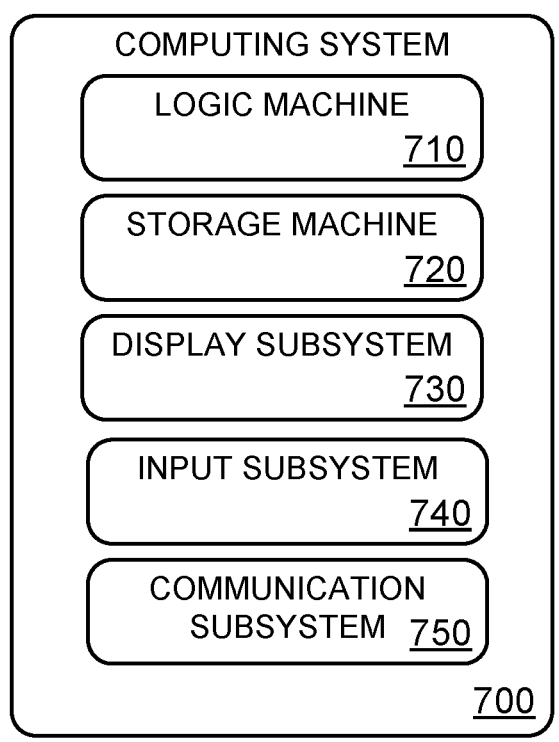
FIG. 7 shows a block diagram of an example computing device.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye-tracker, accelerometer, and/or gyroscope for motion detection and/or intent recognition; as well as electric-field sensing componentry for assessing brain activity.

When included, communication subsystem 750 may be configured to communicatively couple computing system 750 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 750 to send and/or receive messages to and/or from other devices via a network such as the Internet.

In one example, an eye-tracking system comprises one or more optical sources configured to emit infrared light with a narrow spectral linewidth toward an eye of a user; one or more shuttered optical sensors configured to receive infrared light reflected off the eye of the user; and a controller configured to: pulse the one or more optical sources on and off, such that a pulse-on duration is less than a duration needed to fully thermalize each optical source; open the shuttered optical sensor for a detection duration based on the pulse-on duration; and indicate a conformation of the user's eye based on infrared light received at the shuttered optical sensor during the detection duration. In such an example, or any other example, the one or more optical sources may additionally or alternatively be configured to emit infrared light that includes 940 nm light. In any of the preceding examples, or any other example, the one or more optical sources may additionally or alternatively be configured to emit infrared light with a full width at half-maximum ≤5 nm. In any of the preceding examples, or any other example, the one or more optical sources may additionally or alternatively be laser diodes. In any of the preceding examples, or any other example, the laser diodes may additionally or alternatively be vertical-cavity surface-emitting lasers. In any of the preceding examples, or any other example, each shuttered optical sensor may additionally or alternatively include a plurality of deep well PIN photodiodes. In any of the preceding examples, or any other example, each shuttered optical sensor may additionally or alternatively include a plurality of quantum film photodetectors sensitive to infrared light at 940 nm. In any of the preceding examples, or any other example, the quantum film photodetectors may additionally or alternatively be ZnS quantum film photodetectors. In any of the preceding examples, or any other example, the eye-tracking system may additionally or alternatively comprise one or more narrow linewidth IR bandpass filters optically coupled between the one or more optical sources and the one or more shuttered optical sensors. In any of the preceding examples, or any other example, the one or more narrow linewidth IR bandpass filters may additionally or alternatively have a spectral linewidth ≤30 nm.

In another example, a method for active eye-tracking, comprises pulsing on and off a plurality of infrared optical sources configured to emit infrared light with a narrow spectral linewidth toward an eye of a user, such that a pulse-on duration is less than a duration needed to fully thermalize each optical source; opening one or more shuttered optical sensors for a detection duration based on the pulse-on duration, the shuttered optical sensors configured to receive infrared light reflected off the eye of the user; indicating a conformation of the user's eye based on infrared light received at the shuttered optical sensor during the detection duration. In such an example, or any other example, the method may additionally or alternatively comprise directing infrared light emitted by the plurality of infrared optical sources through one or more narrow spectral linewidth infrared bandwidth filters optically coupled between the one or more optical sources and the one or more shuttered optical sensors. In any of the preceding examples, or any other example, the plurality of infrared optical sources may additionally or alternatively be configured to emit infrared light that includes 940 nm light. In any of the preceding examples, or any other example, the plurality of infrared optical sources may additionally or alternatively be configured to emit infrared light with a full width at half-maximum ≤5 nm. In any of the preceding examples, or any other example, the shuttered optical sensors may additionally or alternatively be configured to receive 940 nm infrared light. In any of the preceding examples, or any other example, the shuttered optical sensors may additionally or alternatively be configured to receive 940 nm infrared light with a quantum efficiency greater than 15%. In any of the preceding examples, or any other example, the shuttered optical sensors may additionally or alternatively be configured to receive 940 nm infrared light at a plurality of ZnS quantum film detectors.

In yet another example, a head-mounted display system, comprising: a see-through display mounted to a frame wearable on the head of a user; and an eye-tracking system mounted to the frame, comprising: one or more optical sources configured to emit 940 nm infrared light with a narrow spectral linewidth toward an eye of a user; one or more shuttered optical sensors configured to receive 940 nm infrared light reflected off the eye of the user; and a controller configured to: pulse the one or more optical sources on and off, such that a pulse-on duration is less than a duration needed to fully thermalize each optical source; open the one or more shuttered optical sensors for a detection duration based on the pulse-on duration; and indicate a conformation of the user's eye based on 940 nm infrared light received at the shuttered optical sensor during the detection duration. In such an example, or any other example, the one or more optical sources may additionally or alternatively include vertical-cavity surface-emitting lasers. In any of the preceding examples, or any other examples, the one or more shuttered optical sensors may additionally or alternatively include ZnS quantum film detectors.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An eye-tracking system, comprising:
   one or more optical sources configured to emit infrared light with a narrow spectral linewidth toward an eye of a user;
   one or more shuttered optical sensors configured to receive infrared light reflected off the eye of the user; and
   a controller configured to:
   pulse the one or more optical sources on and off, such that a pulse-on duration is less than a duration needed to fully thermalize each of the one or more optical sources;
   open the one or more shuttered optical sensors for a detection duration based on the pulse-on duration; and
   indicate a conformation of the user's eye based on infrared light received at the one or more shuttered optical sensors during the detection duration.

2. The eye-tracking system of claim 1, wherein the one or more optical sources are configured to emit infrared light that includes 940 nm light.

3. The eye-tracking system of claim 1, wherein the one or more optical sources are configured to emit infrared light with a full width at half-maximum ≤5 nm.

4. The eye-tracking system of claim 1, wherein the one or more optical sources are laser diodes.

5. The eye-tracking system of claim 4, wherein the laser diodes are vertical-cavity surface-emitting lasers.

6. The eye-tracking system of claim 1, wherein each of the one or more shuttered optical sensors includes a plurality of deep well P-type intrinsic N-type diode (PIN) photodiodes.

7. The eye-tracking system of claim 1, wherein each of the one or more shuttered optical sensors includes a plurality of quantum film photodetectors sensitive to infrared light at 940 nm.

8. The eye tracking system of claim 7, wherein the quantum film photodetectors are ZnS quantum film photodetectors.

9. The eye-tracking system of claim 1, further comprising one or more narrow linewidth IR bandpass filters optically coupled between the one or more optical sources and the one or more shuttered optical sensors.

10. The eye-tracking system of claim 9, wherein the one or more narrow linewidth IR bandpass filters have a spectral linewidth ≤30 nm.

* * * * *